(12) United States Patent
Märtin et al.

(10) Patent No.: US 10,942,420 B2
(45) Date of Patent: Mar. 9, 2021

(54) ELLIPSE-LIKE APERTURE FOR A CAMERA LENS ASSEMBLY OR FOR A PHOTO OR FILM CAMERA

(71) Applicant: Vantage Film GmbH, Weiden (DE)

(72) Inventors: Peter Märtin, Weiden (DE); Alexander Przybylla, Landsberg (DE)

(73) Assignee: Vantage Film GmbH, Weiden (DE)

( * ) Notice: Subject to any disclaimer, the term of this patent is extended or adjusted under 35 U.S.C. 154(b) by 0 days.

(21) Appl. No.: 15/746,362

(22) PCT Filed: Jul. 1, 2016

(86) PCT No.: PCT/EP2016/065511
§ 371 (c)(1),
(2) Date: Jan. 19, 2018

(87) PCT Pub. No.: WO2017/012843
PCT Pub. Date: Jan. 26, 2017

(65) Prior Publication Data
US 2018/0210314 A1    Jul. 26, 2018

(30) Foreign Application Priority Data
Jul. 23, 2015  (DE) .................... 10 2015 111 985.4

(51) Int. Cl.
*G02B 9/06* (2006.01)
*G03B 9/06* (2021.01)
(Continued)

(52) U.S. Cl.
CPC .............. *G03B 9/06* (2013.01); *G02B 5/005* (2013.01); *G03B 9/04* (2013.01)

(58) Field of Classification Search
CPC ............. G03B 9/06; G03B 9/04; G02B 5/005
See application file for complete search history.

(56) References Cited

U.S. PATENT DOCUMENTS

| 1,302,359 | A |   | 4/1919  | Garbutt |
|-----------|---|---|---------|---------|
| 1,510,597 | A | * | 10/1924 | Klein ....................... G03B 9/22 396/497 |

(Continued)

FOREIGN PATENT DOCUMENTS

| CN | 202057894 U | 11/2011 |
|----|-------------|---------|
| GB | 2164470 A   | 3/1986  |

(Continued)

OTHER PUBLICATIONS

International Search Report prepared by the European Patent Office for PCT/EP2016/06551, dated Sep. 20, 2016, 7 pages.

(Continued)

*Primary Examiner* — Clayton E. LaBalle
*Assistant Examiner* — Dennis Hancock
(74) *Attorney, Agent, or Firm* — Chernoff Vilhauer LLP

(57) ABSTRACT

The invention relates to an aperture for a photo or film camera lens assembly or for a photo or film camera, where aperture has a device, which defines an ellipse-like opening, at least in part, the primary and secondary axes of which are stationary, by means of which, in the case of vertical alignment of the ellipse-like opening the aesthetic image effect from anamorphic lenses is produced in the unfocused region. The aperture can also include a conventional iris. The ellipse-like opening can be formed by a disc having a fixed, ellipse-like opening or by lamellae forming a linear aperture and which can be moved perpendicular to the main axis of the ellipse-like opening.

14 Claims, 10 Drawing Sheets

(51) Int. Cl.
  *G02B 5/00* (2006.01)
  *G03B 9/04* (2021.01)

(56) References Cited

U.S. PATENT DOCUMENTS

| | | | |
|---|---|---|---|
| 3,433,142 A | 3/1969 | King | |
| 4,047,807 A | 9/1977 | Okano et al. | |
| 5,594,519 A * | 1/1997 | Shimizu | G03B 9/22 396/449 |
| 8,164,813 B1 * | 4/2012 | Gat | G02B 5/005 359/230 |
| 2003/0021041 A1 * | 1/2003 | Bos | B60R 1/00 359/740 |
| 2004/0042785 A1 * | 3/2004 | Watanabe | G03B 9/08 396/463 |
| 2006/0245752 A1 * | 11/2006 | Kawaguchi | G03B 9/14 396/451 |
| 2009/0147127 A1 * | 6/2009 | Ogawa | G03B 17/02 348/374 |
| 2010/0014851 A1 * | 1/2010 | Furuyama | G02B 7/102 396/531 |
| 2011/0085074 A1 * | 4/2011 | Sonoda | G03B 7/095 348/363 |
| 2014/0255019 A1 * | 9/2014 | Muramatsu | G03B 9/40 396/505 |
| 2015/0009551 A1 * | 1/2015 | Kim | G02B 26/02 359/212.2 |
| 2015/0124337 A1 * | 5/2015 | Ito | G02B 13/0095 359/733 |
| 2015/0346583 A1 * | 12/2015 | Yoshizawa | G03B 9/06 396/449 |
| 2018/0074387 A1 * | 3/2018 | Yoshizawa | G03B 9/06 |

FOREIGN PATENT DOCUMENTS

| | | |
|---|---|---|
| GB | 226344 A | 7/1993 |
| JP | S55-063518 | 12/1978 |
| JP | H04-269727 | 9/1992 |
| JP | H1152451 A | 2/1999 |
| JP | 2006317618 A | 11/2006 |
| JP | 2009 271123 A | 11/2009 |

OTHER PUBLICATIONS

Written Opinion prepared by the European Patent Office for PCT/EP2016/06551, dated Sep. 20, 2016, 6 pages.
Translation of the International Preliminary Report on Patentability prepared by the International Bureau for PCT/EP2016/06551, dated Feb. 1, 2018, 8 pages.
Search Report prepared by the Chinese Patent Office for CN 201680043151.2, dated Mar. 24, 2020, 15 pages.
Search Report prepared by the European Patent Office for EP 18153177.3, dated May 28, 2018, 6 pages.
Office Action prepared by the Japanese Patent Office for JP2018-503254, dated Jul. 2, 2020, 6 pages.

* cited by examiner

ELLIPSE-LIKE APERTURE FOR A CAMERA LENS ASSEMBLY OR FOR A PHOTO OR FILM CAMERA

CROSS-REFERENCE TO RELATED APPLICATIONS

This is a national stage application filed under 35 USC 371 based on International Application No. PCT/EP2016/065511 filed Jul. 1, 2016 and claims priority under 35 USC 119 of German Patent Application No. 10 2015 111 985.4 filed Jul. 23, 2015.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

TECHNOLOGICAL FIELD

The present invention relates to an ellipse-like aperture for a photographic or film camera lens or for a photo or film camera.

BACKGROUND OF THE INVENTION

Photographic and film camera lenses are usually equipped with circular irises, which consist of several diaphragm blades and at all apertures have an approximately circular opening transversely to the axis of the lenses. The circularity over all apertures is desirable if the quality of lenses consisting of spherical lenses is to be accommodated with fewest possible aberrations in the recorded image.

On the other hand, there may be applications where, on the contrary, an aberration or alienation of the recorded image is to be achieved. For example, this can be done with attachments or by the construction of the lenses themselves. In the latter case, a lens can be designed so that it achieves a desired distortion (such with, for example, fisheye lenses). However, it can also be the case that for quite different reasons a lens has a construction that leads to alienation as a side effect—this is the case with anamorphic lenses.

Anamorphic lenses, also called "anamorphotes" for short, have been known in the film industry since the 1950s. Influenced by the then rapidly advancing propagation of television, the film industry began at this time to produce films in widescreen format in order to be able to distance themselves from the television—not least in qualitative terms. So for example, 20th Century Fox introduced the CinemaScope method, which uses an anamorphic lens to take horizontally wider images and to horizontally compress them for recording on the film material so as to fit the space available on conventional film; on projection, the image compressed on the film is then stretched horizontally again using a second anamorphic lens, and the end result is a widescreen image projected onto the cinema screen. The anamorphic process is used such that while still using the conventional film format a wider projection format is achieved.

To accomplish this horizontal compression and stretching, the anamorphic lenses include cylindrical lenses having orthogonally different focal lengths (e.g. horizontally 50 mm and vertically 100 mm in a 2-fold anamorphic, that is to say an anamorphic with compression factor 2). If these cylindrical lenses are positioned like an attachment in front of the spherical optics, they act like a wide-angle objective and therefore increase the depth of field of the overall optical system (i.e., in the z-direction), but only along one of the transverse axes of the optical system (horizontal compression in x direction), while this effect does not occur along the other transverse axis (horizontal compression vertical in y direction). This leads to a permanent alienation or abstraction of the blurred areas of the recorded image: Outside the focus plane, oval fuzzy gradients are created that affect all details in the blur area by being distorted as oval gradients (the same applies to the spotlights, which are not depicted as bright circular discs but also as oval)—this alienation can not be reversed completely and remains even with the application of the second horizontally re-stretching anamorphic lens of projection. Therefore, while objects and persons in the focus area after projection (i.e., when using the second anamorphic lens) are displayed as undistorted as desired, they appear slimmer in the blur area since the blur area has the abovementioned residual abstraction. (In this context, it should be noted that the cylindrical lenses can also be positioned behind the spherical optics, but without the above-mentioned effect.) The strength of this effect depends on the compression factor, that is to say according to the ratio of the two focal lengths of the anamorphic lens: the more different the focal lengths and thus the compression factor, the stronger the effect.

This alienation or abstraction of the blurred areas was initially a to be accepted side effect of widescreen films, but it quickly developed into a very desirable visual aesthetic that has gained cult status over the last few decades. For example, anamorphic lenses have been used for filming for some time just to create this effect, with a compression factor of 2 considered optimal for the image-aesthetic effect.

However, anamorphic lenses also have undesired drawbacks. When the cylindrical lenses are positioned in front of the recording spherical optics to produce the pictorial aesthetic effect discussed above, the cylindrical lenses of the anamorphic lenses result in a barrel-shaped geometric distortion that results in quite distracting curvatures of straight lines, especially at short focal lengths. In addition, aberrations arise, that is to say unsharpness in the upper and lower areas of the image field as well as in the corners and on the lateral edges, which are disturbingly noticeable with a fully open aperture. Furthermore, anamorphic lenses have a limited closest focusing distance and a lower lens speed. In addition, the image section changes when focusing and in digital recording, adapted sensors that correspond to the compressed image section are needed. Finally, anamorphic lenses are as a rule more expensive to manufacture and less robust and, due to their larger size and weight, less convenient to handle.

Thus, there is a need to realize the pictorial aesthetics of the anamorphic lenses described above, that is to say their alienation or abstraction of the blurred areas of the recorded image, but without having to accept the disadvantages of these lenses.

BRIEF SUMMARY OF THE INVENTION

It is therefore an object of the present invention to provide an optical system for the film industry which, while retaining the image aesthetics of anamorphic lenses, that is to say the alienation or abstraction of the blurred areas of the recorded image, results in better image quality as well as being easier to produce, easier to use and more flexible in operation.

This has been achieved according to the invention with an aperture for a photographic or film camera lens or for a photographic or film camera, characterized in that the aperture has a device which at least partially defines an ellipse-like opening whose major and axes are stationary.

Other advantageous features of the inventive aperture are disclosed in the dependent claims.

DETAILED DESCRIPTION OF THE INVENTION

Figure 1:
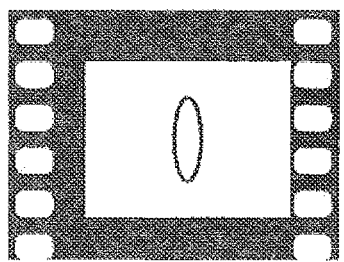
FIG. 1 shows an originally round object imaged with a prior art anamorphic system on a 35 mm film.

FIG. 1 shows a conventional 35 mm film on which an object with a 2-fold horizontal compression factor—i.e., using a 2-fold anamorphic—is shown according to the prior art. The original object was a circle which, due to the 2-fold horizontal compression, has now become an oval. For subsequent projection, a further 2-fold anamorphic lens is used to rectify the film image and to obtain a widescreen image, as with the above described Cinema Scope system used in the 50s. As explained above, those objects and people in the focus area are rectified as desired during projection, but in the blur area an alienation is retained. In the present case, therefore, the projection from the oval located on the film is restored to a circle when it is in the focus area, whereas the oval does not completely become a circle again when it is in the blur area—should the depicted object be a person, he appears slimmer when he is in the blur area. As already mentioned, this side effect, which was initially accepted in widescreen films, has quickly developed into a desired image aesthetic.

The inventors of the present invention have now surprisingly found that this effect can be achieved instead of with anamorphic lenses (in another regard disadvantageous in terms of technical application and optics) by providing a conventional spherical objective lens with an ellipse-like aperture whose longitudinal axis is vertical. The term "ellipse-like" is intended here to include both pure ellipses and all such forms that are elongated and have curved components—accordingly, the terms known from ellipses "major axis" and "minor axis" are analogously transferred to these forms by designating "major axis" for the long axis and "minor axis" for the short axis of the elliptical shape. The compression factor of the anamorphic lenses—which, as explained in the introduction, is responsible for the image-aesthetic effect—corresponds, as transferred to an ellipse, to the ratio of the major and minor axis and can analogously be transferred to ellipse-like forms in the above sense (a real compression of the recorded picture as in the anamorphic lenses does not take place). Since, as mentioned above, a compression factor of 2 has been found to be optimal for the image-aesthetic effect this corresponds, for an ellipse-like opening, to a ratio between the major and minor axes of 2:1.

An ordinary iris diaphragm according to the state of the art consists of a stationary base body into which several blades, in particular circular blades, are inserted. Each of the circular blades has a crescent-shaped contour and has cylindrical pins on its top and bottom, which are located at opposite ends of the circular blade. One of the pins is inserted into the base body, so that the circular blade can perform a rotational movement about this pin, the other pin is guided in a slot of a rotary ring, wherein the number of slots in the rotary ring corresponds to the number of circular blades. Depending on the direction in which the rotary ring is rotated, the circular blades are each rotated about their pin located in the base body and perform, guided in the groove of the rotary ring, a pivotal movement towards or away from each other, resulting in a closing or opening of the aperture defined by the circular blades—which corresponds to the stopping down or opening up of the iris.

Figure 2A:
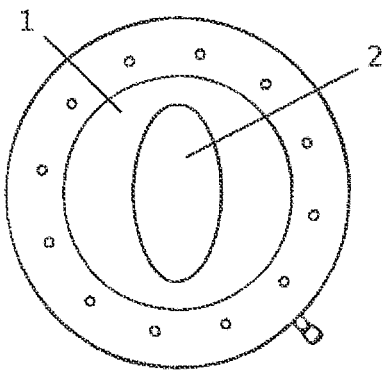
FIGS. 2A-E show a first embodiment of the aperture according to the invention at different apertures of the iris.
Figure 2B:
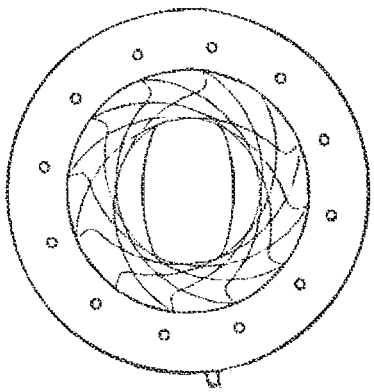
Figure 2C:
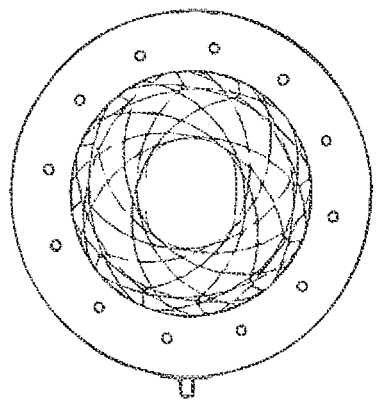

In a first embodiment, the ellipse-like aperture according to the invention comprises a conventional iris, which is provided with an additional immovable disk 1 with a fixed elliptical opening 2 whose major axis is vertical. The disk can be arranged in front of or behind the iris in the z direction (i.e., in the direction of the optical axis). FIGS. 2A-2E show an example of this arrangement, wherein the iris is progressively stopped down: In FIG. 2A the iris is fully open, whereby the elliptical opening 2 of the disc 1 comes fully to fruition, since the major axis of the ellipse is less than or equal to the diameter of the fully opened iris. Upon stopping down as per FIGS. 2B-2E the iris increasingly covers the elliptical opening 2 of the disc 1, until finally the diameter of the further stopped down iris is exactly as large as the minor axis of the ellipse (FIG. 2D) or even smaller (FIG. 2E).

Figure 2D:
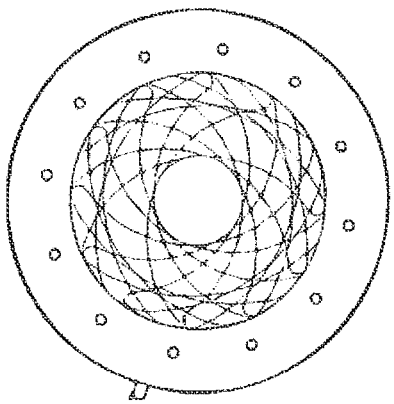
Figure 2E:
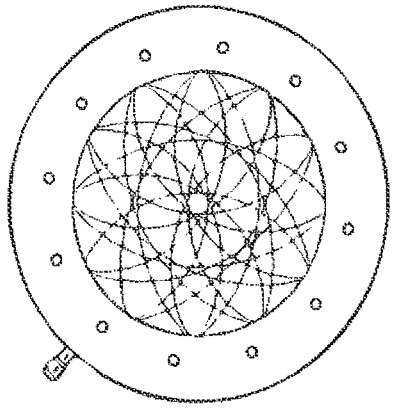

At the beginning (i.e., with an open or only slightly stopped down iris), completely elliptical light transmission is obtained (see FIG. 2A), while at the end (i.e., in the case of a heavily or completely stopped down iris) there is completely circular light transmission (see FIGS. 2D and 2E). As in the intermediate steps according to FIGS. 2B and 2C, the initially elliptical light transmission of the aperture according to the invention thus becomes ever more squat when stopping down, i.e. more circular. This can be a desired effect in certain cases, because when stopping down the depth of field of an optical system increases, which in turn reduces the blur area—which is characterized by the above discussed image aesthetic effect of an anamorphic lens. This can now be compensated for by reducing the anamorphic factor, i.e., the compression factor in the horizontal direction. As described above, the horizontal compressing and stretching by means of the anamorphic lenses is achieved by cylindrical lenses which have orthogonally different focal lengths and lead to a wide angle effect horizontally in the x-direction, whereby the depth of field of the total optical system (in the z-direction) horizontal in the x-direction is increased. This extension of the depth of field is less pronounced the smaller the compression factor in the horizontal direction, i.e., the more this factor approaches 1, which corresponds to a reduction in the compression to its complete absence—and thus back to the original circular shape. Moreover, this corresponds, transferred to the ellipse-like aperture, to the increasingly circular light transmission of the inventive aperture according to the first embodiment upon stopping down. In this way, of course, the image-aesthetic effect—which is precisely generated by the different depths of field in the x and y direction—even is reduced, yet the area in which it occurs is enlarged.

The size ratio between the elliptical opening 2 of the disc 1 and the iris can also be different than shown in FIGS. 2A-2E. The elliptical opening 2 may, for example, be larger, so that even from the start (i.e., with a fully open iris) no purely elliptical light transmission is available. Furthermore, conversely, the iris can be completely dispensed with if stopping down (for example due to the light conditions) is of no great importance and a pure elliptical shape is always desired. Finally, the opening 2 of the disc 1 does not have to be purely elliptical, but may be generally elliptical.

It is of utmost importance for the image aesthetics that the elliptical opening 2 of the disc 1—and thus of course its axis orientation—is stationary, because the above-mentioned "slimming effect" in the blur area, especially of persons, is only achieved in this way. The opposite effect, i.e., a "fattening" of people in the blur area, of course, can be achieved when the major axis of the ellipse-like opening 2 extends horizontally, which corresponds to a vertical compression.

Figure 3A:
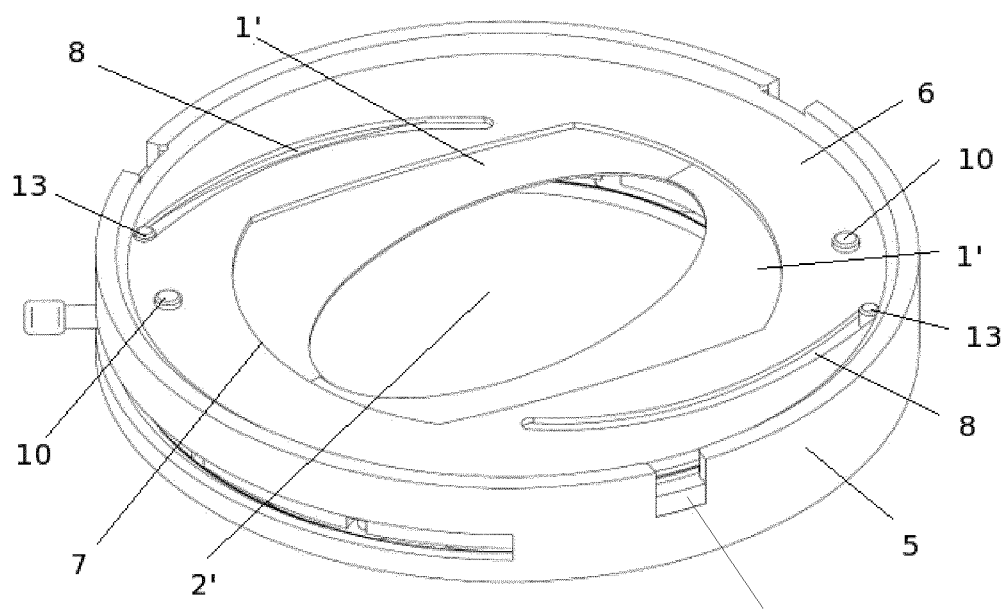
FIG. 3A shows a second embodiment of the aperture according to the invention as an oblique view from above.
Figure 3B:
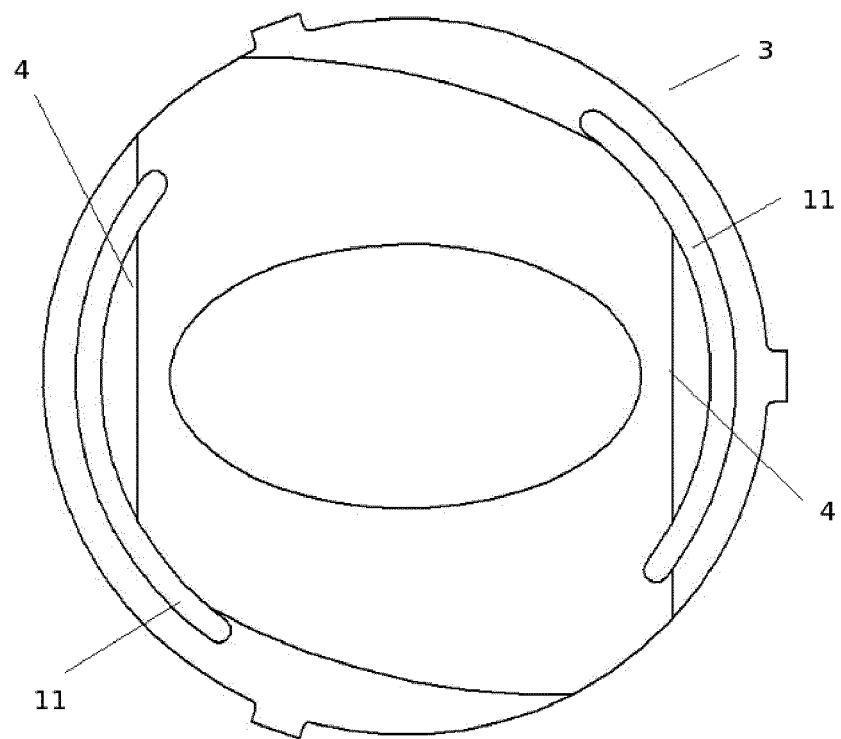
FIG. 3B shows the back part of the aperture of FIG. 3A.
Figure 3C:
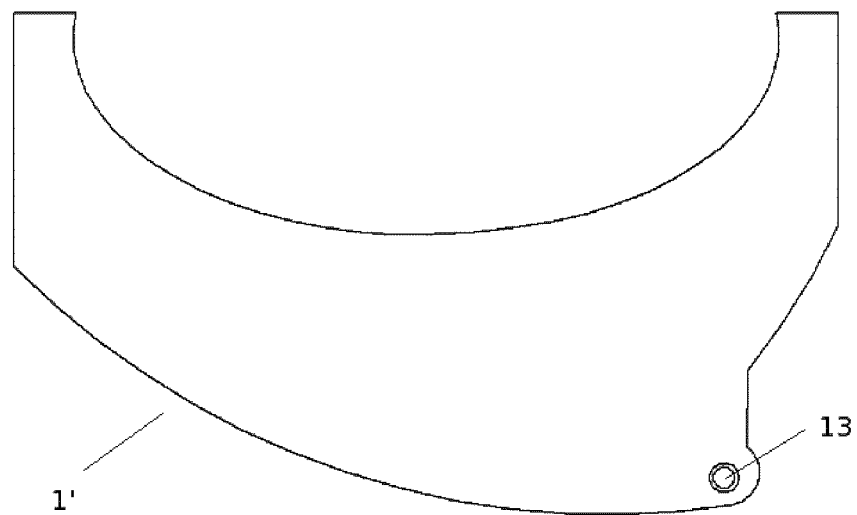
FIG. 3C shows one of the two blades of the linear aperture portion of the aperture of FIG. 3A.
Figure 3D:
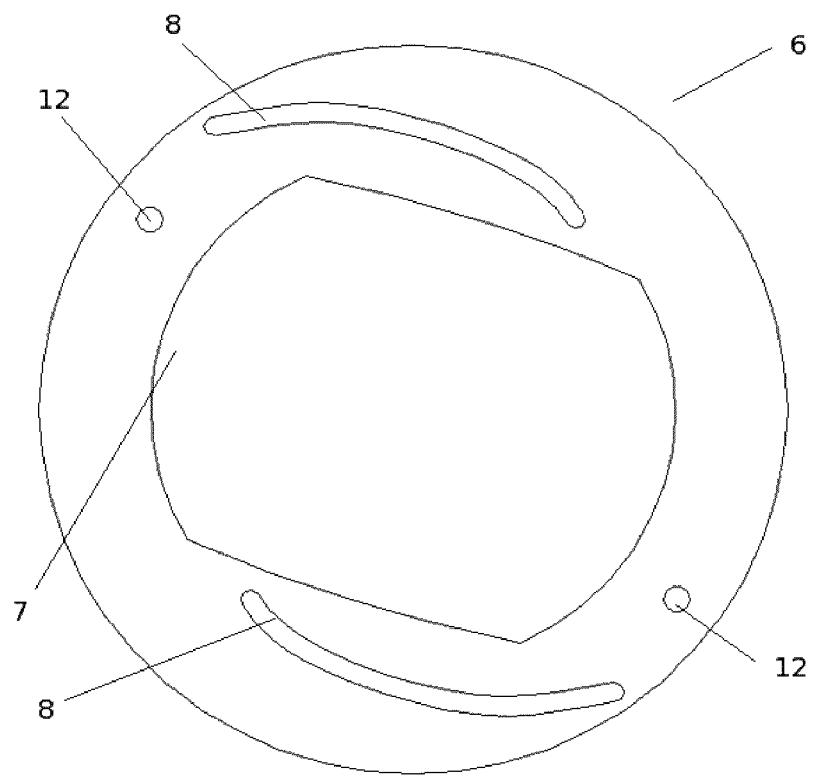
FIG. 3D shows the closing ring of the aperture of FIG. 3A.
Figure 3E:
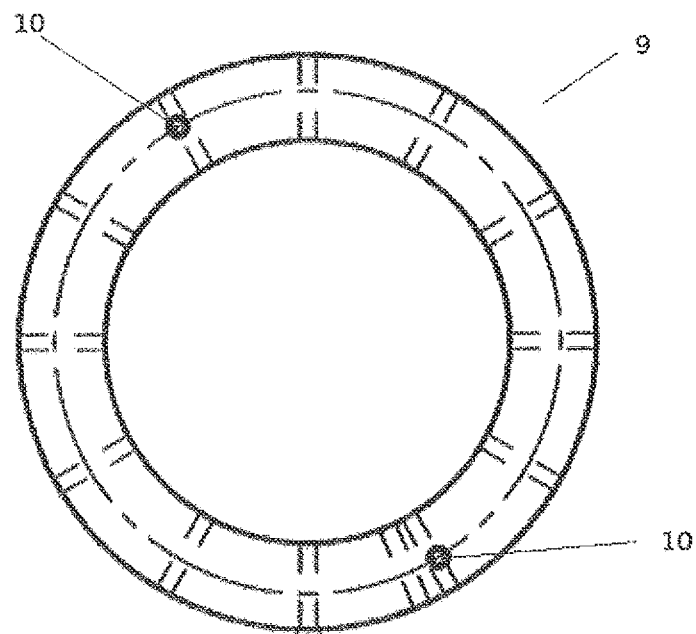
FIG. 3E shows the rotary ring of the aperture of FIG. 3A.

A second embodiment of the aperture according to the invention is shown in FIGS. 3A-E and 4A-F. As in the first embodiment, an iris is provided which is supplemented by further aperture elements. In the z-direction (i.e., in the direction of the optical axis) in front of or behind the iris is a stationary back 3 in the form of a disc having an opening in the middle and two guides 4 (e.g. in the form of edges) and is firmly bound to the main body 5 of the iris (see FIGS. 3A and 3B). Furthermore, a cover ring 6 is provided on the side facing away from the iris of the back 3, which also has an opening 7 and two curved slots 8 (s. FIGS. 3A and 3D) and in contrast to the back 3 is rotatable: The rotary ring 9 of the iris has two pins 10 which extend through a respective groove 11 in the back 3 in two holes 12 in the cover ring 6 (see FIGS. 3A and 3E)—if now the rotary ring 9 is rotated, the cover ring 6 rotates. Between the cover ring 6 and the back 3 there are two blades 1', which each form a semi-ellipse at the edge facing the other blade and therefore form a completely elliptical opening 2' between them when the iris diaphragm is completely open (see FIGS. 3A and 3C and FIG. 4A). On the side facing the cover ring 6 the blades 1' each have a pin 13 which moves in the respective groove 8 of the cover ring 6—should the rotary ring 9, and thus the cover ring 6 be rotated, its rotational movement is converted into a linear movement of both blades 1' so that the opening 2' defined between the two blades 1' is reduced by their linearly horizontal (and thus perpendicular to the major axis of the initially elliptical opening) movement inwardly towards each other whilst stopping down such that they act like a linear shutter. The stopping down of the iris thus simultaneously leads to a stopping down of the linear aperture defined by the blades 1'. The two blades 1' can be moved at their radially outer edges in the respective guide 4 of the back 3 or they can each have a projection on the side facing the back 3, which moves in the respective guide 4 of the back 3, whereby the blades 1' are further supported in their linear motion.

Figure 4A:
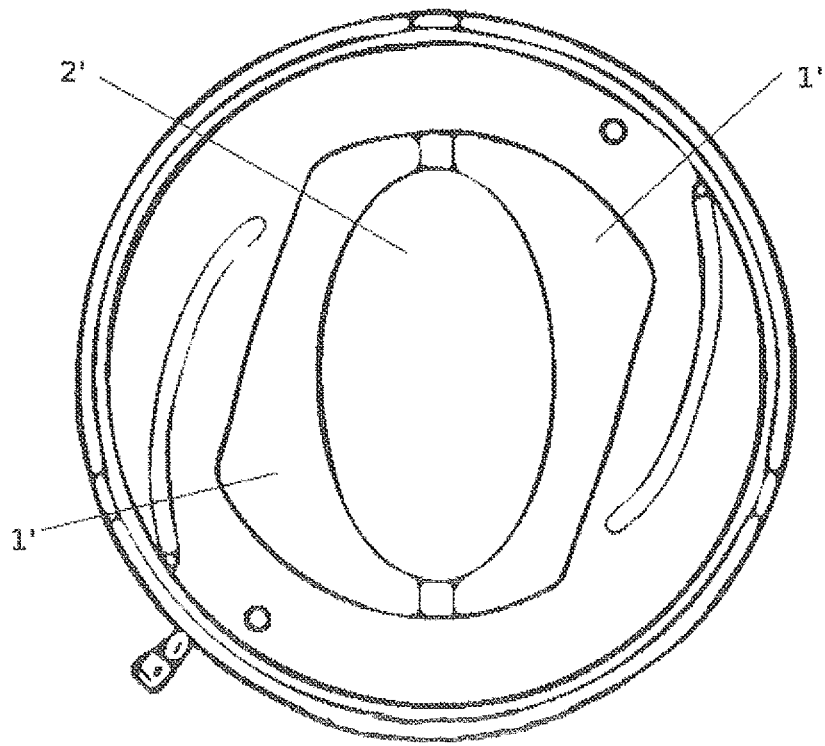
FIGS. 4A-F show the aperture according to the second embodiment at different openings of the iris.
Figure 4B:
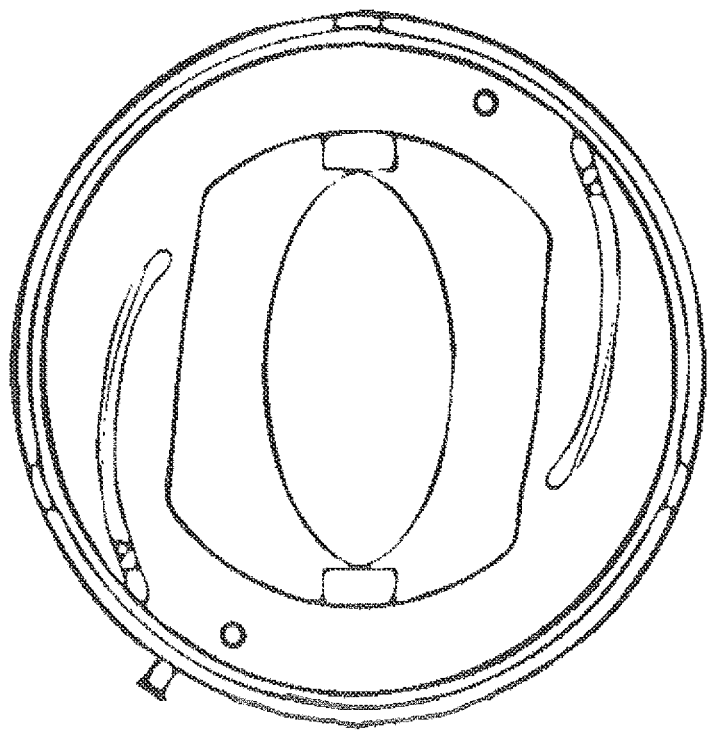
Figure 4C:
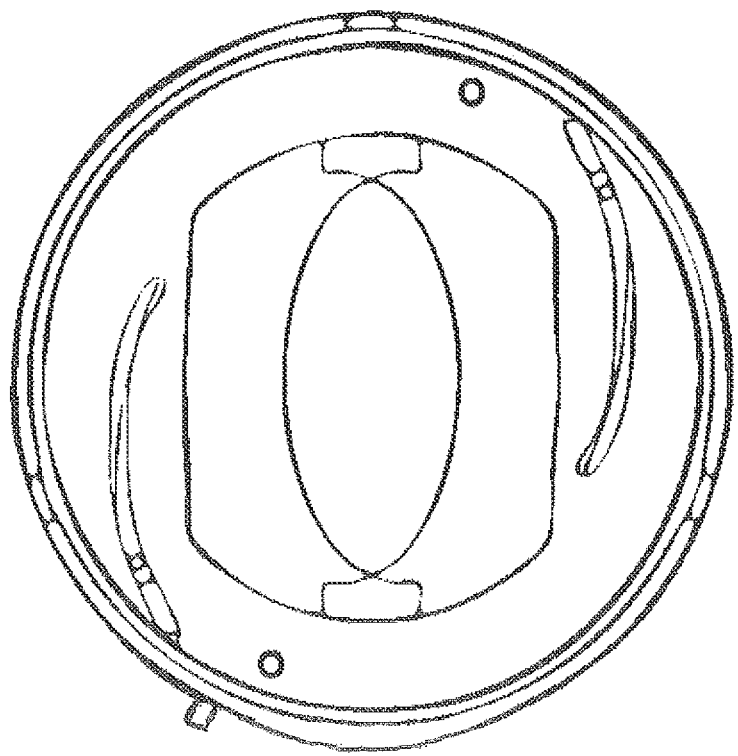
Figure 4D:
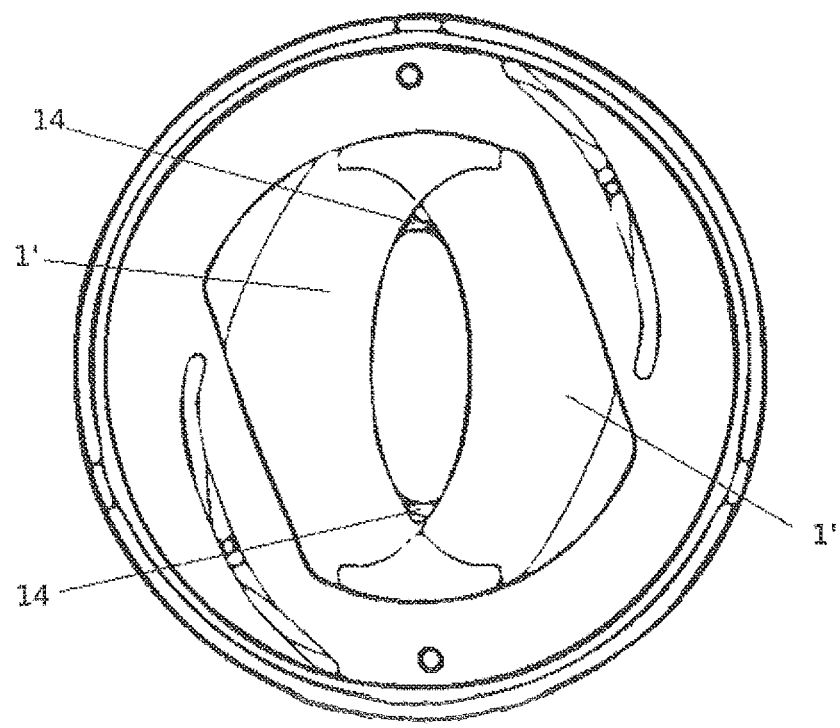
Figure 4E:
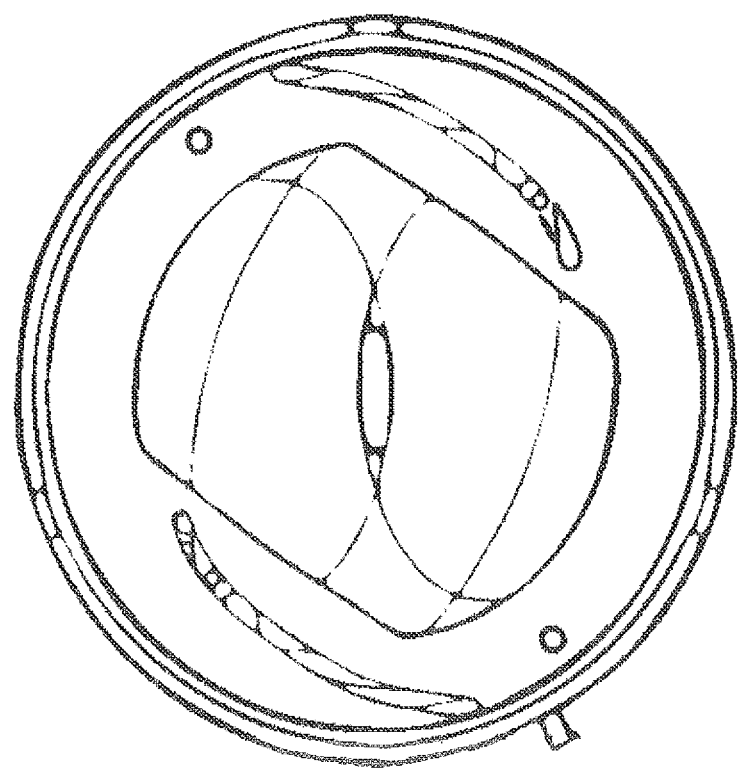
Figure 4F:
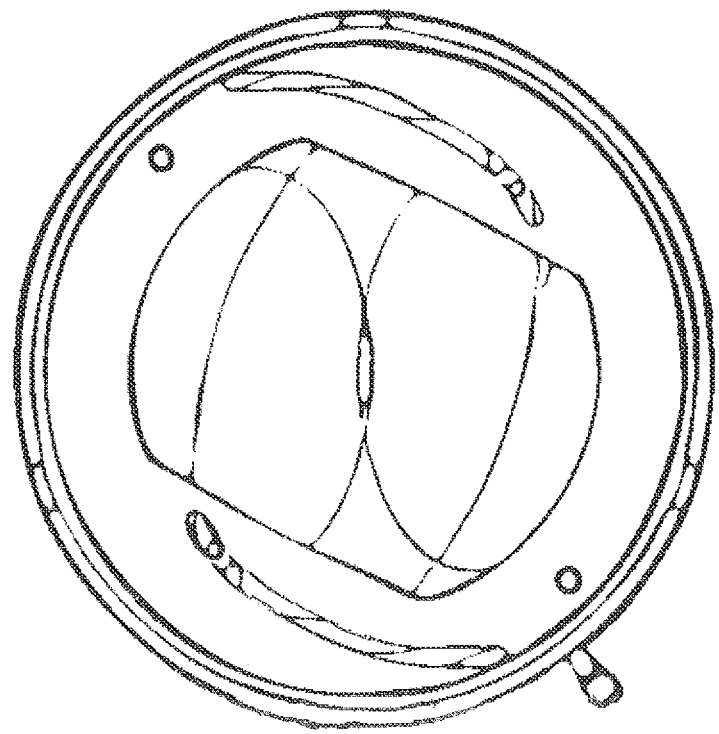
Figure 5:
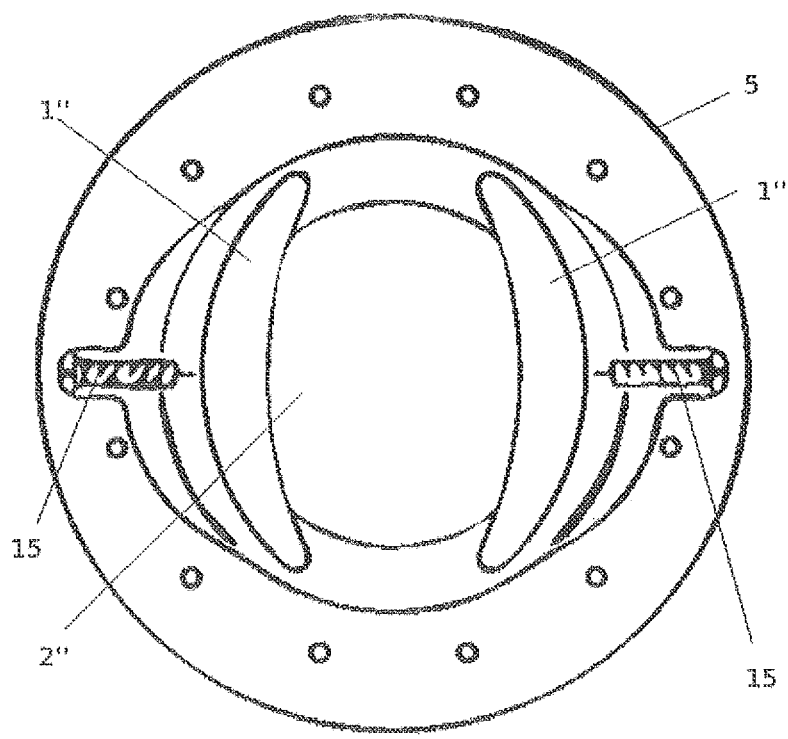
FIG. 5 shows a third embodiment of the aperture according to the invention.
Figure 6A:
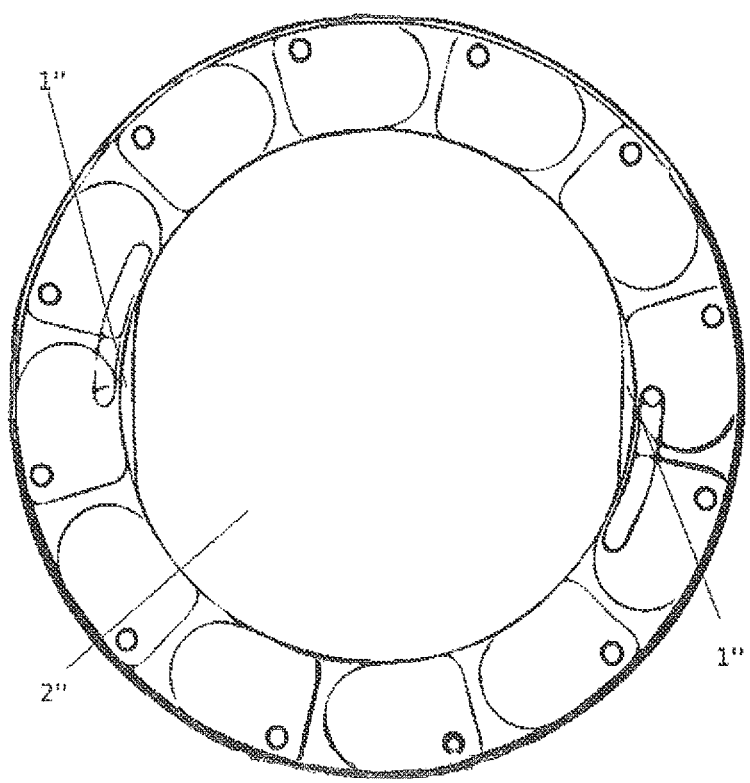
FIGS. 6A-F show the aperture according to the third embodiment at different apertures of the iris.
Figure 6B:
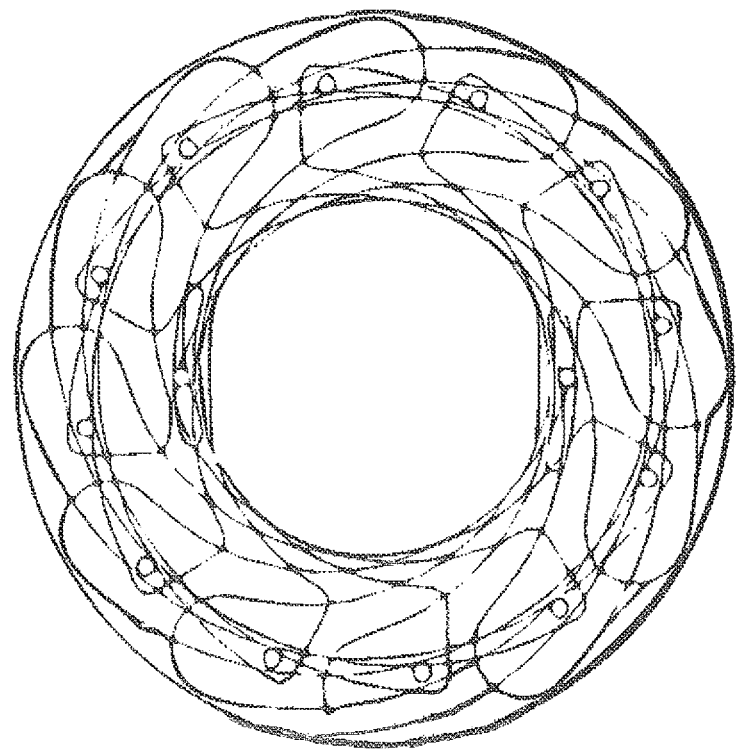
Figure 6C:
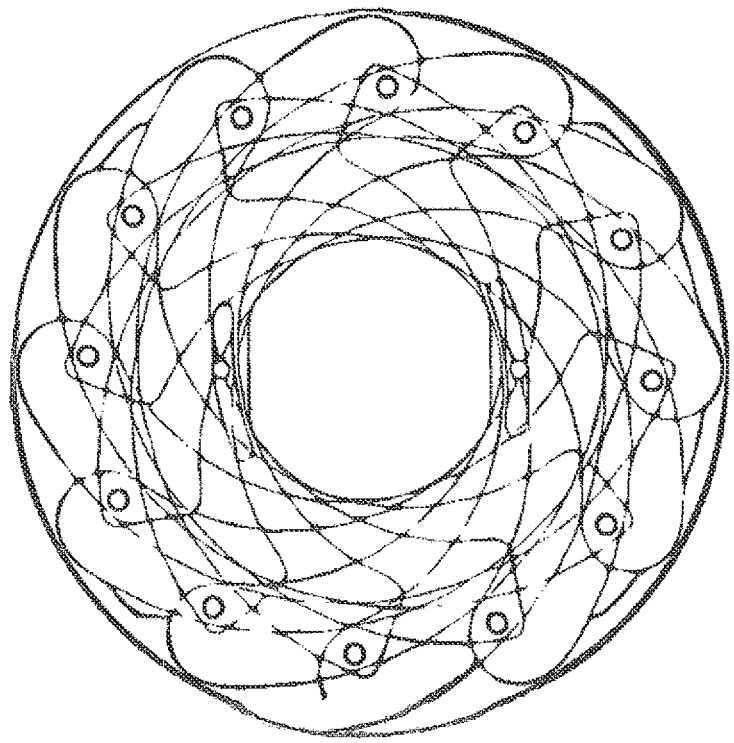
Figure 6D:
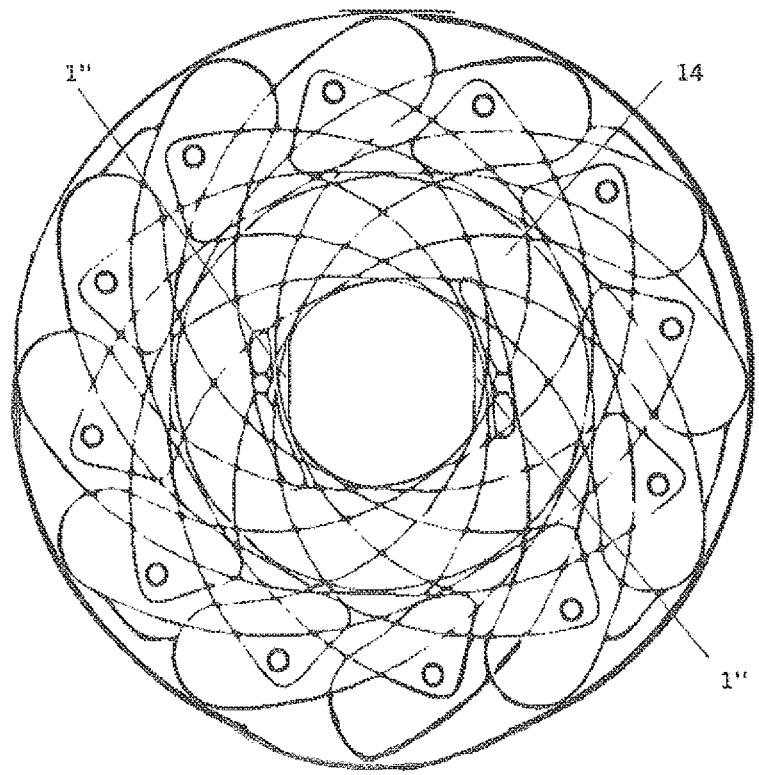
Figure 6E:
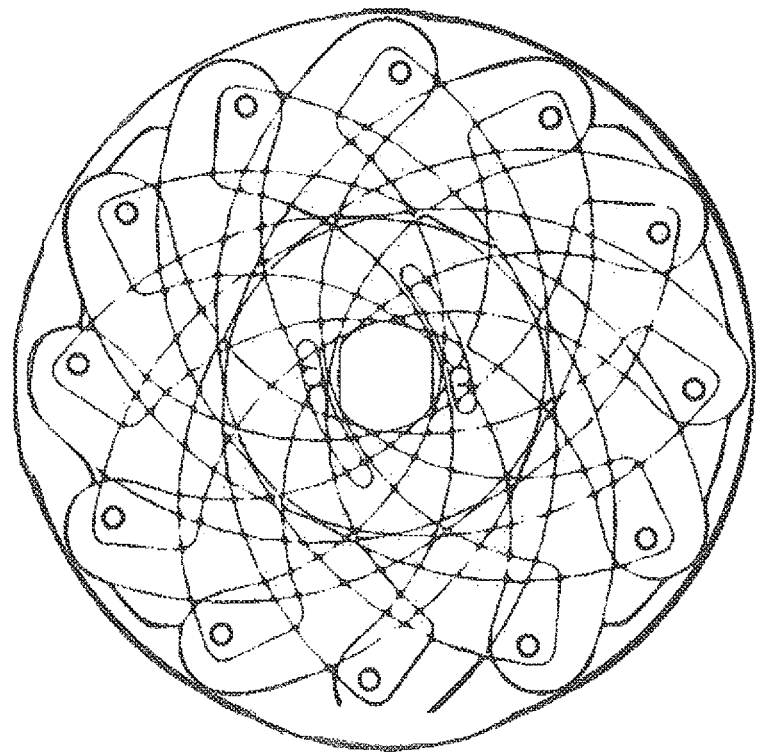
Figure 6F:
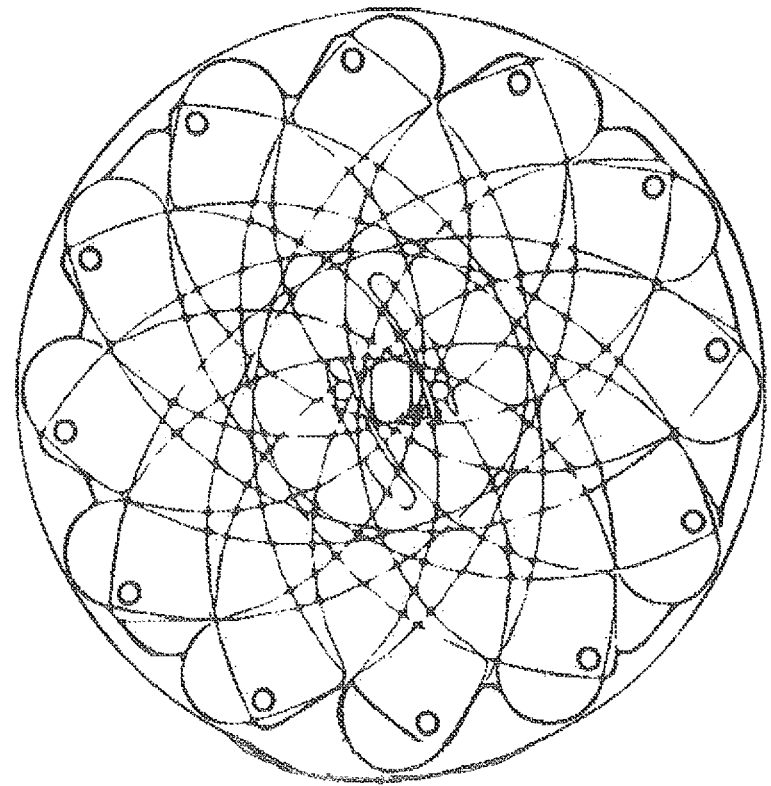

By this superposition of the circular blades 14 of the iris and the blades 1' of the linear aperture, as shown in FIGS. 4A-4F, elliptical light transmission is achieved during the entire stopping down process: In FIG. 4A, the iris is fully open and the aperture 2' of the linear shutter is completely elliptical, i.e. the iris is not yet effective. FIG. 4B shows the first stage of the stopping down, where the iris is still not effective, however, the opening 2' of the linear shutter, by the pushing together of the two blades 1', shows tips at the top and bottom ends and is therefore no longer completely elliptical, but rather is generally elliptical. Upon further stopping down, as shown in FIG. 4D for the first time, the iris comes into play and "rounds off" the tips of the ellipse-like opening 2' of the elliptical opening 2', which is also becoming more and more pronounced due to the progressive pushing against each other of the two blades 1'. This "rounding off" of the upper and lower tips of the opening 2' of the linear aperture through the iris, which also closes further, is then augmented as stopping down is progressed as shown in FIGS. 4D-4F.

At the beginning (i e , with open iris and linear aperture) one thus obtains a completely elliptical light transmission (see FIG. 4A), during stopping down an increasingly narrower generally elliptical light passage is present, which is marked on the right and left sides by the curvature of the linear aperture and at the upper and lower ends by the curvature of the iris (see FIGS. 4E and 4F). As also to be gathered from the intermediate steps as shown in FIGS. 4C and 4D, the initially completely elliptical light passage of the aperture according to the invention is thus ever narrower or slimmer when stopping down, while the upper ends are flattened more and more. This narrowing of the light transmission when stopping down is the stopping down behavior of the first embodiment and may also be desirable in certain cases, for example, when it is less about the quantity of the image-aesthetic effect (i.e., the extent of the blurring area characterized by the image-aesthetic effect of the anamorphic lenses discussed above), but rather its quality: as explained in connection with the first embodiment, the depth of field increases of an optical system when stopping down, which in turn reduces the blur area, which can be compensated by the fact that the anamorphic factor, i.e., the compression factor in the horizontal direction, is reduced (which in turn is at the expense of the image-aesthetic effect itself)—should on the other hand, the image-aesthetic effect itself be strengthened, the compression factor in the horizontal direction must be increased (which in turn is at the expense of the extent or quantity of the image-aesthetic effect).

The linear movement of the blades 1' can also be effected in other ways than via the coupling of the rotary ring 9 with the cover ring 6 and pins 13 of the blades 1' guided in the grooves 8 of the cover ring 6—essential to the implementation of the inventive concept is only the linear movement of blades 1', so that the major axis of the ellipse-like opening 2' does not change its orientation. The importance of maintaining the axis orientation of the ellipse-like opening has already been discussed in connection with the first embodiment. Also, the back 3 is not an essential component for the implementation of the inventive concept, but only a constructive measure to give the movable blades 1' additional stability—if on the other hand the greatest possible stability for the blades 1' is desired, the opening in the back 3 can correspond to the largest elliptical opening 2' between the blades 1' (as shown in FIG. 3B) to achieve the largest possible contact surface.

As in the case of the first embodiment, the size ratio between the ellipsoidal opening 2' of the linear aperture defined by the two blades 1' above and the iris can also be different from the one shown in FIGS. 4A-4F. The elliptical opening 2' may, for example, be smaller, so that the "rounding" of the upper and lower tips of the light transmission of the linear aperture only occurs at advanced stopping down, or vice versa larger, so that when stopping down, tips are never present at the upper and lower ends of the light transmission. Furthermore, the opening 2 of the disk 1 at the beginning does not have to be purely elliptical, but may be generally ellipse-like. Finally, it is also possible to dispense entirely with the iris, in which case the rotary ring 9 serves only to rotate the cover ring 3 or the cover ring is rotated directly by means of suitable gripper elements and the stopping down occurs only by the linear displacement of the blades 1'.

A third embodiment of the aperture according to the invention is shown in FIGS. 5 and 6A-F. As in the first and second embodiments, an iris aperture is provided which is supplemented by further blade elements. From FIG. 5 it can be obtained that in addition to the circular blades 14 on the left and right sides of the main body 5 of the iris each has secured to it a further blade 1" biased in the direction of the outer periphery of the main body 5, for example, by springs 15, while in the direction of the center, blades 1" are attached with the circular blades 14 of the iris, for example, by a clip surrounding the respective circular blade(s) 14. Another type of attachment and carriage of the blades 1" may be to secure them via pins and grooves or holes on several circular blades 14 of the iris. Between them, the blades 1" on the right and left define the longitudinal sides of an elliptical opening 2" whose upper and lower boundaries are defined by the circular blades 14 of the iris. The contour of the blades 1" toward the center can be concave or straight. When the iris is closed, the blades 1" move linearly in the horizontal direction (and thus perpendicular to the major axis of the ellipse-like opening) toward each other. The stopping down of the iris thus leads, as in the second embodiment, at the same time to a stopping down of the linear diaphragm defined by the blades 1", by moving them linearly toward one another.

As a result of this superimposition of the circular blades 14 of the iris and the blades 1" of the linear aperture, one obtains, as shown in FIGS. 6A-6F, ellipse-like light transmission through the entire stopping down procedure: already in the open state, the light transmission is already elliptical and only almost circular, since on its right and left sides, the circular iris is covered by the blades 1" of the linear aperture (whose inner contours are here executed straight) and thereby is narrowed horizontally. As in the second embodiment, upon further stopping down as in FIGS. 6B-6F, the elliptical light transmission becomes ever narrower as the two blades 1" are progressively pushed against each other.

Finally (i.e., with strongly or completely stopped down iris and linear aperture), as with the second embodiment, a narrow elliptical light transmission is available characterized on the right and left sides by the inner contour of the blades 1" of the linear aperture 2" and on the top and bottom ends by the curvature of the iris. This narrowing of the light transmission upon stopping down may be, as already explained in connection with the second embodiment, desirable in certain applications, for example, when it is less about the quantity of the image-aesthetic effect (that is, the extent of the blurring range which is a characteristic image-aesthetic effect of the anamorphic lenses discussed above) and more about its quality.

The linear movement of the blades 1" can also be effected in other ways than via their coupling to the outer sides of the base body 5 and the circular blades 14 of the iris—essential to implementation of the inventive idea is merely the linear movement of the blades 1", such that the major axis of the ellipse-like opening 2" does not change its orientation. The importance of maintaining the axis orientation of the ellipse-like opening has already been discussed in connection with the first embodiment.

As with the first and second embodiments, the size ratio between the ellipse-like opening 2" defined by the two blades 1" of the linear aperture and the iris can also be different from that shown in FIGS. 6A-6F. The ellipse-like opening 2" can, for example, be smaller, so that the "slimming" of the light transmission is greater. Furthermore, it is also possible to dispense entirely with the iris, in which case the upper regions of the ellipse-like opening 2" are not formed by the circular blades 13 of the iris, but by a disc having a fixed, round opening, and stopping down is only by the linear displacement of the blades 1", which in turn can be held and moved by a suitable device, for example on resembling the cover ring 6 of the second embodiment with its curved grooves 8.

For all the embodiments described above, which are to be regarded as examples of the inventive concept of the present invention, it is true that they implement the image aesthetics known from anamorphic lenses, but have clear advantages over the anamorphic lenses. First, the optical aberrations of the anamorphic lenses, i.e. the barrel-shaped geometric distortion, which lead, especially at short focal lengths, to quite annoying curvatures of straight lines, are avoided, as well as the aberrations caused by blurring in the upper and lower regions of the field and in the corners and at the lateral edges, which with a fully open aperture are disruptively noticeable. Furthermore, the present invention allows the use of sharper lenses with higher speed and greater close-up limit, and the image section does not change with focusing, as is the case with anamorphic lenses. Furthermore, no matched sensors corresponding to the image section compressed by the anamorphic lens are needed because there is no real compression of the recorded image. Moreover, the awkwardness of the anamorphic lenses (due to their size and weight) is avoided since the aperture of the invention can be used with conventional lenses consisting exclusively of spherical lenses. For this reason, the entire optical system is also cheaper because the spherical lenses or their camera systems can be easily converted while avoiding the complex manufacturing process of anamorphic lenses, which also leads to their lesser robustness. Moreover, the aperture according to the invention allows a much higher flexibility, since the compression effect can be varied depending on the embodiment upon changing the shape of the ellipse-like aperture during stopping down, without (as in the Anamorphic lenses) needing to change the lens.

The invention claimed is:

1. Aperture for a photographic or film camera lens or for a photographic or film camera, comprising:

a device comprising two blades (1'; 1") defining therebetween an ellipse-like opening (2'; 2") having a major axis and a minor axis, wherein each of the two blades is configured to selectively move between a plurality of positions and linearly towards or away from the other blade in a direction perpendicular to the major axis, wherein the plurality of positions includes a fully open position, a fully stopped down position, and a plurality of intermediate positions therebetween, wherein, when the two blades (1'; 1") are in the fully open position, the major and minor axes of the ellipse-like opening (2'; 2") are at their maximum lengths, wherein, when the two blades (1'; 1") are in the fully stopped down position, the major and minor axes of the ellipse-like opening (2'; 2") are at their minimum lengths, wherein the orientation of the major and minor axes remain stationary in the plurality of positions, wherein the length of the major axis is greater than length of the minor axis in the plurality of positions, and wherein the device does not include a linearly-moving blade other than the two blades (1'; 1").

2. Aperture according to claim 1, characterized in that the major axis of the ellipse-like opening (2'; 2") is vertical.

3. Aperture according to claim 1, characterized in that it further comprises an iris in addition to the device (1'; 1").

4. Aperture according to claim 3, characterized in that the major axis of the ellipse-like opening (2') is less than or equal to a diameter of the fully opened iris, such that light transmission of the aperture when stopping down from an initial elliptical shape (2') at full opening of the iris and of the linear aperture defined by the blades (1') becomes increasingly narrower and bounded at a top and bottom by circular blades (14) of the iris.

5. Aperture according to claim 3, characterized in that the contour of the blades (1") towards a center of the iris is concave or straight.

6. Aperture according to claim 1, characterized in that it further comprises, in the direction of an optical axis directly in front of or behind the blades (1'), a cover ring (6) which is either coupled with a rotary ring (9) and rotatable together with the rotary ring or which is directly rotatable via suitable gripping elements, and which has an opening (7) and two curved grooves (8) into which in each case a pin (13) provided on each blade (1') on the side facing the cover ring (6) engages, so that the blades (1') move linearly toward or away from each other during rotation of the rotary ring (9).

7. Aperture according to claim 6, characterized in that it is further provided, on the side of the blades (1') facing away from the cover ring (6), with a stationary rear part (3) with an opening on which the blades (1') rest in order to provide them with additional stability.

8. Aperture according to claim 7, characterized in that the rear part (3) further comprises two guides (4) in which are engaged projections provided on the side of each blades (1') facing the rear part (3), so that the blades (1') are additionally supported in their linear motion.

9. Aperture according to claim 1, characterized in that the two blades (1") define therebetween the opposite longitudinal sides of the ellipse-like opening (2").

10. Aperture according to claim 1, characterized in that the blades (1") are secured on opposite sides of a circular base body (5) of the iris and thereby biased in the direction of the outer circumference of the base body (5) and in the direction of the center of the iris connected with circular blades (14) of the iris by pins and grooves or holes or by clamps surrounding the respective circular blades, so that the blades (1") move linearly toward or away from each other during the rotation of a rotary ring (9) of the iris.

11. Aperture according to claim 1, characterized in that each blade of the two blades (1'; 1") includes a curvilinear edge that is facing the other blade.

12. Aperture according to claim 11, characterized in that the curvilinear edge of each blade of the two blades (1'; 1") forms a semi-ellipse.

13. Aperture according to claim 11, characterized in that only the curvilinear edge of each blade of the two blades (1'; 1") defines the ellipse-like opening (2'; 2") therebetween.

14. Aperture according to claim 1, characterized in that the ellipse-like opening (2'; 2") is a pure ellipse opening (2'; 2").

\* \* \* \* \*